United States Patent Office 3,003,893
Patented Oct. 10, 1961

3,003,893
RUBBERIZED BITUMINOUS SEALANT AND METHOD OF USE
Clyde W. Mertz, Bartlesville, Okla., assignor to Phillips Petroleum Company, a corporation of Delaware
No Drawing. Filed June 3, 1957, Ser. No. 663,011
8 Claims. (Cl. 117—135)

This invention relates to an improved rubberized bituminous sealing composition. In another aspect this invention relates to an asphaltic sealant which is modified with an elastomer having improved oil resistance. In still another aspect this invention relates to a method of sealing joints, seams, or the like, with a rubberized bituminous composition which can be cured in situ.

Rubberized bituminous compositions comprising blends of various grades of asphalt and natural or synthetic rubbers have been found useful as sealing compositions for metal parts, particularly at joints or seams. These compositions serve the double purpose of protecting the metallic members from corrosive attack plus dampening noise. In the manufacture of automobiles it is desirable to apply material of this type to metal joints of car bodies prior to painting them and passing them through the baking cycle. Formulation of asphaltic blends therefore which are both easily applied yet capable of withstanding high temperatures, for example, about 300° F., is highly desirable.

According to my invention an improved rubberized bituminous sealing composition is provided which is fluid and adhesive in its uncured state and when heated under conditions such as prevail in a paint baking process, cures to a tough, oil resistant, protective coating. This composition comprises a blend of asphalt with a polymer of a monomer system comprising conjugated diene and heterocyclic nitrogen-base monomer selected from pyridine and quinoline compounds. In its preferred form the composition of my invention also comprises reinforcing agents of the type normally employed in rubber compounding and can include for improved processability various amounts of liquid polybutadiene. A composition of my invention can be applied to metal parts and cured by quaternization and/or vulcanization during the enamel baking cycle.

It is an object of my invention to provide an improved rubberized bituminous sealing composition which can be applied readily at normal temperatures yet will cure to a tough, oil resistant covering.

It is another object of my invention to provide an asphaltic sealant which can be applied to the metal joints of an automobile body prior to painting and cured during the normal paint baking cycle.

It is another object of my invention to provide an asphaltic sealant which will withstand relatively high temperatures without flowing or crumbling, yet will adhere strongly to metal parts.

Still another object is to provide a method of applying such a composition to a metallic object and subsequently curing by quaternization at elevated temperatures such as occur in an enamel baking oven.

Other objects, advantages and features of my invention will be apparent to those skilled in the art from the following description and appendant claims.

The essential materials employed in the sealant composition of my invention are asphalt and quaternizable copolymer of conjugated diene and a heterocyclic nitrogen-base monomer selected from pyridine or quinoline compounds. A preferred copolymer is butadiene/2-methyl-5-vinylpyridine, as either a liquid or a solid elastomer. A terpolymer can also be used, such as butadiene/2-methyl-5-vinylpyridine/acrylonitrile. The asphalts employed are those having a high ring and ball softening point, for example, those softening in the range of about 140 to 275° F., generally about 150 to 250° F. Lower softening asphalts, for example, those softening at about 130° to 140° F., can be employed by increasing the amount of inert filler which tends to stiffen the asphalt and make it more resistant to flow. The asphalts which are preferred to yield a highly durable sealant are those having a ring and ball softening point in the range of about 175 to 225° F. Suitable asphaltic materials are air blown asphalt and catalyzed air blown asphalt employing such catalysts as phosphorus pentoxide and zinc chloride. Vacuum reduced virgin asphalt and naturally occurring asphalts such as Gilsonite are also suitable. Solvent extracted asphalt and cracked asphalts from cracked crude can be used, preferably when air blown. The above list is not exhaustive and other types of high softening asphalts comparable to the above-named materials as known in the art can be used.

The quaternizable heterocyclic nitrogen-base polymers which are used in the composition of my invention are known in the art and their formation per se is not a part of this invention. Polymers of this type and quaternization thereof are fully described in a copending application of Pritchard, filed June 4, 1956, Serial No. 588,957.

The copolymers and terpolymers used in my invention can be prepared by any suitable method, such as by emulsion polymerization or by mass polymerization employing an alkali metal catalyst. Copolymers of heterocyclic nitrogen-base monomers and conjugated dienes can be formed by either of the above methods to yield materials having a wide range of molecular weights ranging from fluid and very viscous liquids to rubbery solids. A convenient method of preparing these polymers is by polymerization of the monomers in an aqueous emulsion in the presence of soap, potassium persulfate and an aliphatic mercaptan. At the conclusion of the reaction a shortstopping agent and an antioxidant are added. Coagulation can be effected by various well-known techniques and the polymer dried. Heating in a vacuum at a temperature of about 60° C. for about 48 hours is generally sufficient to dry the polymer. In the preparation of the solid product, approximately 0.25 to 0.5 part of mercaptan modifier are utilized. In the preparation of the liquid polymer, however, as high as 10 parts of mercaptan modifier are used, thus terminating the chain lengths to form the liquid copolymer.

The monomers employed in the polymerization of the polymer used in my invention include conjugated dienes having at least 4 carbon atoms per molecule and generally not more than 8 carbon atoms. Preferred among these is 1,3-butadiene. Other conjugated dienes such as isoprene, piperylene, methylpentadiene, 2,3-dimethyl-1,3-butadiene, chloroprene, and others, are suitable however. Various alkoxy derivatives such as methoxy and ethoxy, as well as cyano derivatives of these conjugated diolefins can also be used.

The heterocyclic nitrogen-base monomers which are used in the monomer system have the formula

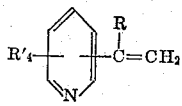

or

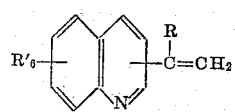

or

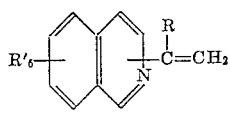

where R is a hydrogen or a methyl radical and each R' is selected from hydrogen and alkyl radicals, the combind R' groups having a total of not over 12 carbon atoms.

Representative heterocyclic nitrogen-base compounds include: 2-vinylpyridine; 2-methyl - 5 - vinylpyridine; 5-methyl-2-vinylpyridine; 3 - ethyl-5-vinylpyridine; 5-ethyl-2-vinylpyridine; 4-methyl-3-vinylpyridine; 2,3,4-trimethyl-5-vinylpyridine; 2-isopropenylpyridine; 5-propyl - 2 - isopropenylpyridine; 2-octyl-5-vinylpyridine; 5 - dodecyl - 2-vinylpyridine; 2-vinylquinoline; 8-ethyl-2-vinylquinoline; 4-hexyl-5-vinylquinoline; 1 - vinylisoquinoline; 5 - methyl-1-isopropenylisoquinoline; and the like.

Generally the heterocyclic nitrogen-base monomer used for my invention is a monovinyl pyridine, preferably an alkyl C-substituted monovinyl pyridine. Preferred among these is 2-methyl-5-vinylpyridine.

For the production of the copolymers employed in the practice of my invention the amount of conjugated diene is generally in the range of from 50 to 98 parts by weight per 100 parts of copolymer. Preferably the heterocyclic nitrogen-base monomer makes up at least 5 and not over 40 weight percent of the polymer. The copolymers which are preferred are butadiene/2-methyl-5-vinylpyridine copolymers having a combined methylvinylpyridine content of about 5 to 30 weight percent. Up to 30 and preferably about 20 parts by weight of acrylonitrile can also be employed in the monomer system to form an excellent oil resistant terpolymer. Polymers as above described, in either the liquid or soft rubber state, can be bended with asphalt by any conventional blending system to form a sticky, sealing composition which can be easily applied to metal surfaces and cured to a tough solid by quaternization of the heterocyclic nitrogen base.

Quaternizing agents or mixtures thereof which are suitable to effect a cure of the compositions of my invention include various halogen-substituted hydrocarbons such as substituted cycloalkanes and substituted alkanes. These compounds contain at least one hydrogen atom attached to a carbon atom. The substituted alkanes in turn include alkyl halides, alkylene halides, and aromatic substituted halogenated alkanes. Representative cycloalkanes include 1,2-dibromocyclohexane, 1-methyl-2,3-dichlorocyclopentane, and the like. Representative alkyl halides include methyl iodide, methyl bromide, ethyl iodide, propyl iodide, hexyl iodide, nonyl iodide, cetyl bromide, and the like. Representative alkylene halides include 1,2-dichloroethane, 1,2-dibromoethane, 1,2-dichloropropane, 1,2-dibromooctane and the like. Representative aromatic substituted halogenated alkanes include benzyl chloride, benzal chloride, benzotrichloride, and halogenated xylenes, particularly the chlorinated xylenes such as 1,3-, and 1,4-bis(trichloromethyl)benzene; 1,2-, 1,3- and 1,4-bis(dichloromethyl)benzene; 1,2-, 1,3- and 1,4-bis(monochloromethyl)benzene; 1-trichloromethyl-2-dichloromethylbenzene; 1 - trichloromethyl - 4-monochloromethyl-benzene; 1-dichloromethyl - 3 - monochloromethyl-benzene; and the like.

Other halogen substituted alkanes include bromoform, chloroform, iodoform and the like which contain at least one hydrogen atom attached to a carbon atom. The substituted halogenated hydrocarbons also include 2,3-dibromopropene-1 and various polyhalogenated alkanes such as 1,2,3,4-tetra-bromobutane and polyhalogenated cycloalkanes such as hexachlorocyclopentadiene. Other halogenated organic compounds useful as quaternizing agents include acetyl chloride, chloro acetyl chloride, ethylene chlorohydrin, picryl chloride, benzoyl chloride, benzene sulfonyl chloride, and the like. Another useful group of quaternizing agents includes methyl sulfate, ethyl sulfate, methylbenzene sulfate, and the like. The foregoing enumeration is not intended to include all the possible suitable quaternizing agents, but is only representative since many others can be used.

The quaternizing agents which are especially valuable in curing my compositions are the organic halides, particularly such agents as paraxylenehexachloride, benzotrichloride, benzylchloride, benzalchloride and chloranil. The amount of quaternizing agent generally employed is that sufficient to convert a portion of the pyridine or quinoline units of the polymer to the corresponding pyridinium or quinolinium units. If desired, more or less than a stoichiometric amount of quaternizing agent can be employed depending upon the desired physical properties of the product. Generally, the amount of quaternizing agent is about 0.2 to 1.1 mols per mol of reacted nitrogen in the polymer. Cellular products can be produced by employing an excess of quaternizing agent, for example, up to 5 mols per mol of reacted nitrogen. The curing temperature at which a quaternizing agent is reacted can range from about 50° to 500° F. although higher or lower temperatures can be used. When curing the compositions of my invention, I prefer to effect quaternization at a temperature in the range of about 150 to 400° F. Time required to substantially completely effect a reaction is dependent upon the temperature employed and usually varies from a few minutes, about 5 to 10 minutes, to about 10 hours or more.

The compositions of my invention can be prepared with advantages in processability by incorporating therein small amounts of liquid polybutadiene. Preparation of liquid polymer of this type is known in the art and described in U.S. Patent 2,631,175, issued March 10, 1953, to W. W. Crouch. This method of manufacture involves the polymerization of 1,3-butadiene in the presence of an alkali metal catalyst in a suitable diluent such as benzene, toluene, xylene, and the like. The alkali metal catalyst is employed in a finely divided state and the reaction temperature is in the range of about 60° to 110° C. Pressure of the reaction is that sufficient to maintain the diluent in the liquid form and the reaction is effected with agitation over a period of about 1 to 8 hours. A similar type of polymerization can be employed to copolymerize butadiene and methylvinylpyridine, thus forming a suitable quaternizable polymer for an essential ingredient of my invention.

When compounding the composition of my invention, I prefer to employ various amounts of filler, preferably reinforcing agents normally used in rubber compounding such as carbon black and various mineral fillers, for example, silica, alumina, diatomaceous earth, and the like. An advantage of the composition herein described is its especially good adaptability with mineral reinforcing agents. Mineral fillers are, therefore, preferred for compounding these compositions. Other inert fillers such as asbestos can be employed, if desired, and such use is normally advantageous when lower melting asphalts are employed. In the blended composition asphalt is present in a major amount, generally about 50 to 90 weight percent of the total composition. For maximum adhesive qualities and toughness of the cured product I prefer a composition having an asphalt content of about 70 to 80 weight percent. Reinforcing agents of the rubber-compounding types can be used in rather large quantities, broadly about 2 to 40 weight percent of the total composition being suitable. As the amount of filler is increased, the ease with which the sealant can be applied is reduced unless a more fluid or lower softening asphalt is employed. I prefer, however, to maintain the amount of inorganic filler in my composition in the range of about 5 to 25 weight percent.

The heterocyclic nitrogen-base polymer is effective in my composition in surprisingly small quantities, as low as 1 percent being suitable; this is especially true when liquid polybutadiene is also employed. Broadly, the amount of quaternizable polymer can vary from 1 to 30 weight percent of the total composition and the amount of liquid polybutadiene from 0 to 29 weight percent with the total of the two polymeric materials, polybutadiene and quaternizable polymer, comprising not over 30 weight percent of the total composition. Thus, as the amount of liquid polybutadiene is increased, the quaternizable polymer can be decreased and still yield a tough, oil-resistant and adhesive coating which will neither crumble nor flow while being cured at elevated temperatures. A preferred composition contains from 1 to 15 weight percent quaternizable copolymer or terpolymer and from 0 to 14 weight percent liquid polybutadiene, with the combined polymeric materials comprising at least 5 and not over 15 weight percent of the total composition. The composition thus formulated can be quaternized and/or vulcanized as above described to yield the improved protective coatings of my invention.

Blending procedures are those employed in the art such as mill mixing, masticating, or mixing in an internal (Banbury) mixer. Quaternizing agent and/or vulcanization compounds and accelerators should be added toward the end of the mixing cycle in which elevated temperatures are used so that a minimum of pre-cure occurs before the composition can be applied to its point of usage. These materials are extremely tacky and viscous although fluid enough to permit application by spreading or spraying in a coarse spray. Upon quaternization of the copolymer, especially with organic halide quaternizing agents, such as hexachloroparaxylene and benzotrichloride, a tight bond is effected between the composition and the metal part to which it has been applied. This bond appears to be of a chemical nature since, on removal of the quaternized elastomer, small pits in the surface of the metal part are observed.

To further describe the compositions of my invention and their method of use, the following examples of specific embodiments are presented below.

Four polymers having a heterocyclic nitrogen-base are prepared in emulsion polymerization according to the following recipes:

|  | Parts by Weight | | | |
| --- | --- | --- | --- | --- |
|  | A | B | C | D |
| Water | 200 | 200 | 200 | 200 |
| Butadiene | 85 | 75 | 70 | 75 |
| 2-Methyl-5-vinylpyridine | 15 | 25 | 10 | 25 |
| Acrylonitrile | | | 20 | |
| Potassium, fatty acid soap | 6 | 6 | 6 | 6 |
| Potassium hydroxide | 0.1 | 0.1 | 0.1 | 0.1 |
| Potassium chloride | 0.3 | 0.3 | 0.3 | 0.3 |
| Tamol N [1] | 0.3 | 0.3 | 0.3 | 0.3 |
| Ferrous sulfate-heptahydrate | 0.02 | 0.02 | 0.02 | 0.02 |
| Sequestrine AA [2] | 0.04 | 0.04 | 0.04 | 0.04 |
| Sodium formaldehyde sulfoxylate | 0.1 | 0.1 | 0.1 | 0.1 |
| p-Menthane hydroperoxide | 0.1 | .1 | 0.1 | .1 |
| t-Dodecylmercaptan | 0.48 | 0.48 | 0.48 | 10 |

[1] Sodium salt of naphthalene sulfonic acid condensed with formaldehyde.
[2] Ethylene diamine tetracetic acid.

The temperature is held at 41° F. and the pressure sufficient to maintain a liquid phase. Half of the t-dodecylmercaptan is added initially and half at 60 percent conversion. After 20 hours, at about 95 percent conversion, the reaction is shortstopped by the addition of 0.15 part by weight of a 50/50 mixture of sodium dimethyldithiocarbamate and sulfur in the form of sodium polysulfide. Two parts of phenyl-β-naphthylamine is added as an antioxidant.

The polymer of recipe D is a clear liquid having a bound methylvinylpyridine content of about 17 weight percent. The other polymers are solid elastomers. These polymers are compounded with asphalt and reinforcing agent to form the improved compositions of my invention.

Suitable compounding recipes are shown below:

|  | Parts by Weight | | | |
| --- | --- | --- | --- | --- |
| Asphalt [1] | 80 | 65 | 70 | 80 |
| Polymer A | 5 | | | |
| Polymer B | | 10 | | |
| Polymer C | | | 10 | |
| Polymer D | | | | 15 |
| Carbon Black | 5 | | | 5 |
| Silica | | 25 | | |
| Liquid polybutadiene [2] | 10 | | 10 | |
| Zinc oxide | 0.25 | 0.5 | 0.5 | 0.75 |
| Stearic acid | 0.05 | 0.1 | 0.1 | 0.15 |
| Sulfur | | 0.025 | 0.025 | 0.04 |
| Plasticizer SC [3] | | 2 | 2 | |
| p-Xylene Hexachloride | | 1 | 0.5 | 1.5 |
| Benzotrichloride | 1 | | | |

[1] An air-blown asphalt having a ring and ball softening point of about 200° F.
[2] Sodium catalyzed polymer having a viscosity at 100° F. of 2500 to 5000 centipoises and a specific gravity $D^{20}/4$ of 0.91.
[3] Triethylene glycol ester of low boiling acids of coconut oil.

The resultant blends are sticky, viscous fluids. They are then cured at 307° F. for 45 minutes to form the rubberized asphaltic materials of my invention. These materials, in addition to being able to withstand the high heat of the paint baking cycle, have improved resistance to oils, chemicals and weather conditions. Thus an excellent automobile metal joint sealant is provided.

I claim:

1. A heat curable rubberized bituminous sealing composition comprising from 50 to 90 weight percent high-softening asphalt, from 2 to 40 weight percent rubber-compounding reinforcing agent selected from the group consisting of carbon black and mineral filler, up to 29 weight percent liquid polybutadiene, a quaternizing amount or organic halide quaternizing agent, and from 1 to 30 weight percent polymer of butadiene and alkyl C-substituted monovinyl pyridine of less than 20 carbon atoms, said polymer being both vulcanizable and quaternizable to a tough, oil resistant elastomer.

2. A heat curable rubberized bituminous sealing composition comprising from 50 to 90 weight percent high-softening asphalt, from 2 to 40 weight percent rubber-compounding reinforcing agent selected from the group consisting of carbon black and mineral filler, up to 29 weight percent liquid polybutadiene, a quaternizing amount of organic halide quaternizing agent, and from 1 to 30 weight percent terpolymer of butadiene/2-methyl-5-vinylpyridine/acrylonitrile, said polybutadiene and terpolymer together comprising not over 30 weight percent of the composition and said terpolymer being both vulcanizable and quaternizable to a tough, oil resistant elastomer.

3. A heat cured rubberized bituminous sealing composition comprising from about 70 to 80 weight percent high-softening asphalt, from about 5 to 25 weight percent rubber-compounding reinforcing agent selected from the group consisting of carbon black and mineral filler, from 1 to 15 weight percent quaternized copolymer of butadiene and 2-methyl-5-vinylpyridine, said copolymer having from 5 to 40 weight percent bound methylvinylpyridine and having been quaternized with organic halide quaternizing agent, and up to 14 weight percent liquid polybutadiene, said polybutadiene and said copolymer together being not less than 5 and not over 15 weight percent of the total composition.

4. A rubberized bituminous sealing composition comprising from about 70 to 80 weight percent high-softening asphalt, from about 5 to 25 weight percent rubber-compounding reinforcing agent selected from the group consisting of carbon black and mineral filler, and from 5 to 15 weight percent liquid copolymer of butadiene and 2-methyl-5-vinylpyridine, said copolymer having from 5 to 40 weight percent bound methylvinylpyridine and admixed therewith a quaternizing amount of organic halide quaternizing agent, said composition being a viscous fluid easily applied to metal surfaces and curable at temperatures of about 300° F. to a rubbery protective coating.

5. A heat curable rubberized bituminous sealing composition comprising from 50 to 90 weight percent asphalt, from 2 to 40 weight percent rubber reinforcing agent selected from the group consisting of carbon black and mineral filler, up to 29 weight percent liquid polybutadiene, from 1 to 30 weight percent polymer of conjugated diene having 4 to 8 carbon atoms per molecule and heterocyclic nitrogen-base monomer having the formula selected from the group consisting of

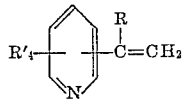

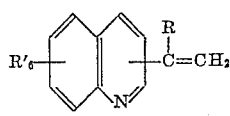

and

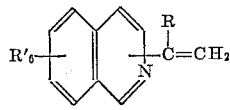

where R is selected from the group consisting of hydrogen and methyl radical, each R′ is selected from the group consisting of hydrogen and alkyl radicals, the combined R′ groups totaling not over 12 carbon atoms, and sufficient organic quaternizing agent having at least 1 hydrogen atom attached to a carbon atom to quaternize said polymer.

6. A method of sealing metal-to-metal joints which comprises forming a blend composing 50 to 90 weight percent high-softening asphalt, 2 to 40 weight percent rubber-compounding reinforcing agent selected from the group consisting of carbon black and mineral filler and 1 to 30 percent by weight of a copolymer of butadiene and 2-methyl-5-vinylpyridine having incorporated therein a quaternizing amount of organic halide quaternizing agent, maintaining the temperature of said blend during mixing sufficiently low to prevent any appreciable curing reactions, applying said blend to a metal joint, and elevating the temperature of said joint sufficiently to cure said blend thereon to a tough, adherent, oil resistant seal.

7. A method of sealing metal-to-metal joints on the underside of a car body which comprises blending a high-softening asphalt with a quaternizable liquid copolymer of butadiene and 2-methyl-5-vinylpyridine, an organic halide quaternizing agent, and rubber-compounding reinforcing agent to form a tacky, viscous, fluid composition comprising from 70 to 80 weight percent asphalt, from 5 to 25 weight percent rubber reinforcing agent selected from the group consisting of carbon black and mineral filler and from 5 to 15 weight percent of said copolymer, applying said composition to said joints forming a coating thereon, and subjecting said composition to elevated temperatures of about 150 to 400° F. for at least about 20 minutes to thereby effect cure in situ of said composition to a tough, adherent rubbery protective seal.

8. A method of coating a metal surface which comprises blending 50 to 90 parts by weight of asphalt, 2 to 40 parts of rubber reinforcing agent selected from the group consisting of carbon black and mineral filler, up to 29 parts of liquid polybutadiene, and 1 to 30 parts of polymer of conjugated diene having 4 to 8 carbon atoms per molecule and heterocyclic nitrogen-base monomer having the formula selected from the group consisting of

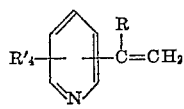

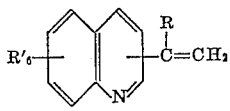

and

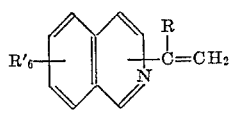

where R is selected from the group consisting of hydrogen and methyl radical, each R′ is selected from the group consisting of hydrogen and alkyl radicals, the combined R′ group totaling not over 12 carbon atoms, adding sufficient organic quaternizing agent having at least one hydrogen atom attached to a carbon atom to quaternize said polymer, applying the resultant blend to a metal surface to form a coating thereon, and curing said blend to a tough, oil resistant material by elevating the temperature of said metal surface and coating.

References Cited in the file of this patent
UNITED STATES PATENTS

| | | |
|---|---|---|
| 2,260,420 | Young | Oct. 28, 1941 |
| 2,619,445 | Kalafus | Nov. 25, 1952 |
| 2,638,460 | Crouch | May 12, 1953 |
| 2,681,331 | Howland et al. | June 15, 1954 |
| 2,892,592 | Greene et al. | June 30, 1959 |